(12) United States Patent
D'Alo et al.

(10) Patent No.: US 7,930,677 B2
(45) Date of Patent: Apr. 19, 2011

(54) METHOD, SYSTEM AND COMPUTER PROGRAM FOR TRACKING SOFTWARE DEVELOPMENT

(75) Inventors: Salvatore D'Alo, Nino Taranto (IT); Alessandro Donatelli, Rome (IT); Antonio Perrone, Rome (IT); Scot MacLellan, Rome (IT)

(73) Assignee: International Business Machines Corporation, Armonk, NY (US)

( * ) Notice: Subject to any disclaimer, the term of this patent is extended or adjusted under 35 U.S.C. 154(b) by 1061 days.

(21) Appl. No.: 11/457,020

(22) Filed: Jul. 12, 2006

(65) Prior Publication Data
US 2007/0028213 A1  Feb. 1, 2007

(30) Foreign Application Priority Data

Jul. 12, 2005  (EP) .................................... 05106358

(51) Int. Cl.
*G06F 9/44* (2006.01)
*G06F 9/46* (2006.01)
(52) U.S. Cl. .......................................... 717/101; 705/9
(58) Field of Classification Search .......... 717/100–103; 705/9
See application file for complete search history.

(56) References Cited

U.S. PATENT DOCUMENTS

| | | | |
|---|---|---|---|
| 6,519,763 B1 * | 2/2003 | Kaufer et al. | 717/101 |
| 7,212,987 B2 * | 5/2007 | Swanke et al. | 705/9 |
| 7,562,338 B2 * | 7/2009 | Knutson et al. | 717/101 |
| 2003/0033586 A1 * | 2/2003 | Lawler | 717/101 |

OTHER PUBLICATIONS

Teresa Stover, "Microsoft Office Project 2003 Inside Out", Oct. 1, 2003, Microsoft Press, p. 57, 78-79, 123-125, 283-289, and 797.*
Stover, "Microsoft Office Project 2003 Inside Out," Oct. 29, 2003, Misrosoft Press. (Partial Resend.).*

* cited by examiner

*Primary Examiner* — Wei Y Zhen
*Assistant Examiner* — Chung Cheng
(74) *Attorney, Agent, or Firm* — Garg Law Firm, PLLC; Rakesh Garg; Jeffrey S. LaBaw (57) ABSTRACT

A solution (300) for tracking computer software development (for example, based on UML diagrams) is proposed. In the solution of the invention, a completion coefficient is associated (312) with each activity concerning the development process (to indicate the effort required to complete it). The activities are organized into a tree (starting from a root node for the whole development process). In operation, a user tunes (333-336) a progress index for each micro-activity represented by a leaf node of the tree (to indicate its actual progress). The progress index of each macro-activity represented by a non-leaf node of the tree is instead calculated (357-360) by aggregating the progress indexes of its depending activities weighted according to the respective completion coefficients (with a recursive process down to the micro-activities). In this way, the progress of the development process can be tracked with an incremental approach at different levels of detail.

16 Claims, 5 Drawing Sheets

METHOD, SYSTEM AND COMPUTER PROGRAM FOR TRACKING SOFTWARE DEVELOPMENT

FIELD OF THE INVENTION

The present invention relates to the data processing field. More specifically, the present invention relates to the tracking of computer software development in a data processing system.

BACKGROUND ART

The development of computer software is a very critical activity; the problem is particular acute for large software applications, which are intended to run in a multi-tier and heterogeneous environment.

Several modeling tools have been proposed in the last years to aid developers (such as software designers and programmers) to master the inherent complexity of the developing process; for example, a very popular modeling tool is the "Rational Rose" by IBM Corporation. Generally, a modeling tool provides an Integrated Development Environment (IDE) for supporting the various phases relating to the building of each application (for example, its requirement definition, architectural design, code specification, and the like). For this purpose, the developers define a series of models; each model consists of an abstraction, which provides a simplified representation of the corresponding real artifact to be built. Preferably, the models are defined by using the Unified Modeling Language (UML). The UML is a standard modeling language, which provides a (graphical and textual) syntax and an underlying semantic for specifying all the aspects relating to the development of computer software (especially of the object-oriented type).

In this way, it is possible to visualize, assess and communicate the application before its actual realization (so as to reduce the risks of the corresponding development). Moreover, the models may be used to create and maintain the code of the application in a very simple, safe and time effective manner. Those aspects are particularly important for applications having distributed architecture, to be integrated with other systems, or intended to be used in critical environments.

Nevertheless, the task of developing computer software remains a complex and time-consuming activity. Particularly, the development process involves the contribution of a number of different actors (such as end-users, architects, designers, programmers, and the like). Moreover, each intervention may span a very long period and may be interrelated with several different activities.

Therefore, it is very difficult to track the actual progress of the development process.

Moreover, every developer that needs to use a model (created by another developer) does not have any idea of its completion status (unless s/he directly communicates with its author).

As a result, it is not possible to coordinate the activities of the different actors in an efficient manner.

All of the above hinders any orchestration of the human resources that are allocated to the development process (for example, when an activity creates a bottleneck for other activities depending on its completion). This may have a detrimental impact on the yield of the whole development process (thereby increasing its length and cost).

SUMMARY OF THE INVENTION

The present invention provides a solution for tracking computer software development based on an incremental approach.

Particularly, an aspect of the invention proposes a method for tracking computer software development in a data processing system. The development includes a plurality of activities organized in a hierarchical structure (i.e., a tree); the structure includes non-leaf activities (which have other activities depending thereon) and leaf activities (which have no other activity depending thereon). The method starts with the step of associating a completion coefficient with each activity; the completion coefficient is indicative of an effort required to complete the activity. A progress index is also associated with each leaf activity; the progress index is instead indicative of a current progress of the leaf activity. The method continues by selecting a non-leaf activity. An aggregated progress index of the selected activity is then calculated by aggregating the progress indexes of the activities depending thereon weighted according to the corresponding completion coefficients (i.e., by means of a recursive process wherein the progress index of each depending activity is equal to the corresponding progress index for a leaf activity or it is calculated by aggregating the progress indexes of the activities depending thereon for a non-leaf activity). The aggregated progress index of the selected activity is then displayed.

In a preferred embodiment of the invention, a user is prompted to enter the progress index of each leaf activity after closing a corresponding working session.

A way to improve the solution is of suggesting a value of the progress index; this value is calculated by comparing a current number of basic items (which definition is required for accomplishing the activity) with an estimated total number thereof.

Preferably, the total number is initialized by the user.

As a further enhancement, the total number is corrected (at the closure of every working session) according to a comparison between the current number of the basic items and the progress index set by the user.

In addition, the total number can also be updated according to a comparison between its current value and one or more previous values thereof.

In an embodiment of the invention, the proposed solution is applied to modeling activities.

Typically, those activities are defined according to the UML specification.

A further aspect of the present invention proposes a computer program for performing the above-described method.

Moreover, another aspect of the present invention proposes a corresponding system.

The characterizing features of the present invention are set forth in the appended claims. The invention itself, however, as well as further features and the advantages thereof will be best understood by reference to the following detailed description, given purely by way of a nonrestrictive indication, to be read in conjunction with the accompanying drawings.

REFERENCE TO THE DRAWINGS

DETAILED DESCRIPTION

Figure 1:
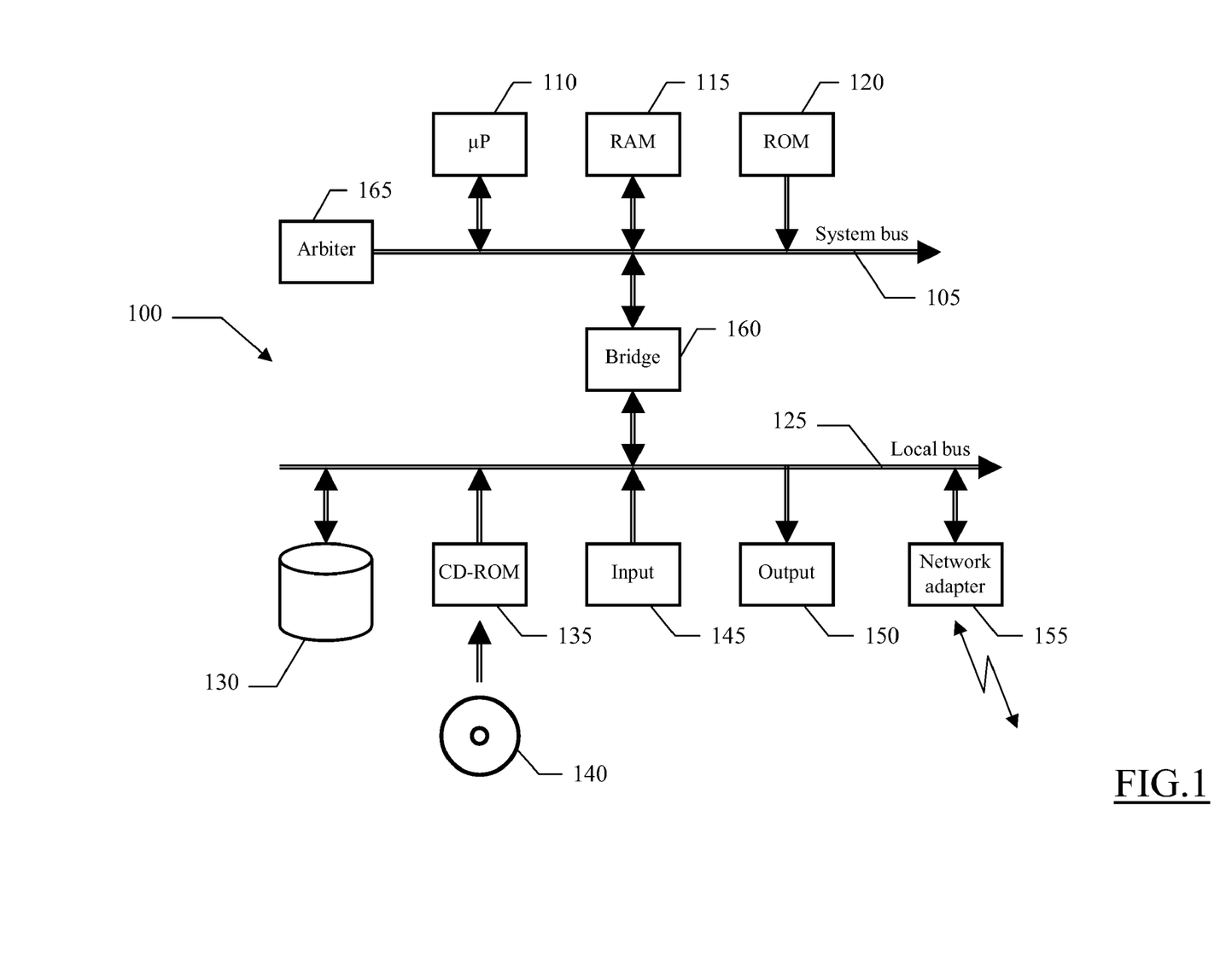
FIG. 1 is a schematic block diagram of a computer on which the solution according to an embodiment of the invention is applicable.

With reference in particular to FIG. 1, a computer 100 (such as a Personal Computer) is illustrated. The computer 100 is formed by several units that are connected in parallel to a system bus 105. In detail, one or more microprocessors (μP) 110 control operation of the computer 100; a RAM 115 is directly used as a working memory by the microprocessors 110, and a ROM 120 stores basic code for a bootstrap of the computer 100. Several peripheral units are clustered around a local bus 125 (by means of respective interfaces). Particularly, a mass memory consists of a hard-disk 130 and a drive 135 for reading CD-ROMs 140. Moreover, the computer 100 includes input units 145 (for example, a keyboard and a mouse), and output units 150 (for example, a monitor and a printer). An adapter 155 is used to connect the computer 100 to a network. A bridge unit 160 interfaces the system bus 105 with the local bus 125. Each microprocessor 110 and the bridge unit 160 can operate as master agents requesting an access to the system bus 105 for transmitting information. An arbiter 165 manages the granting of the access with mutual exclusion to the system bus 105.

Figure 2:
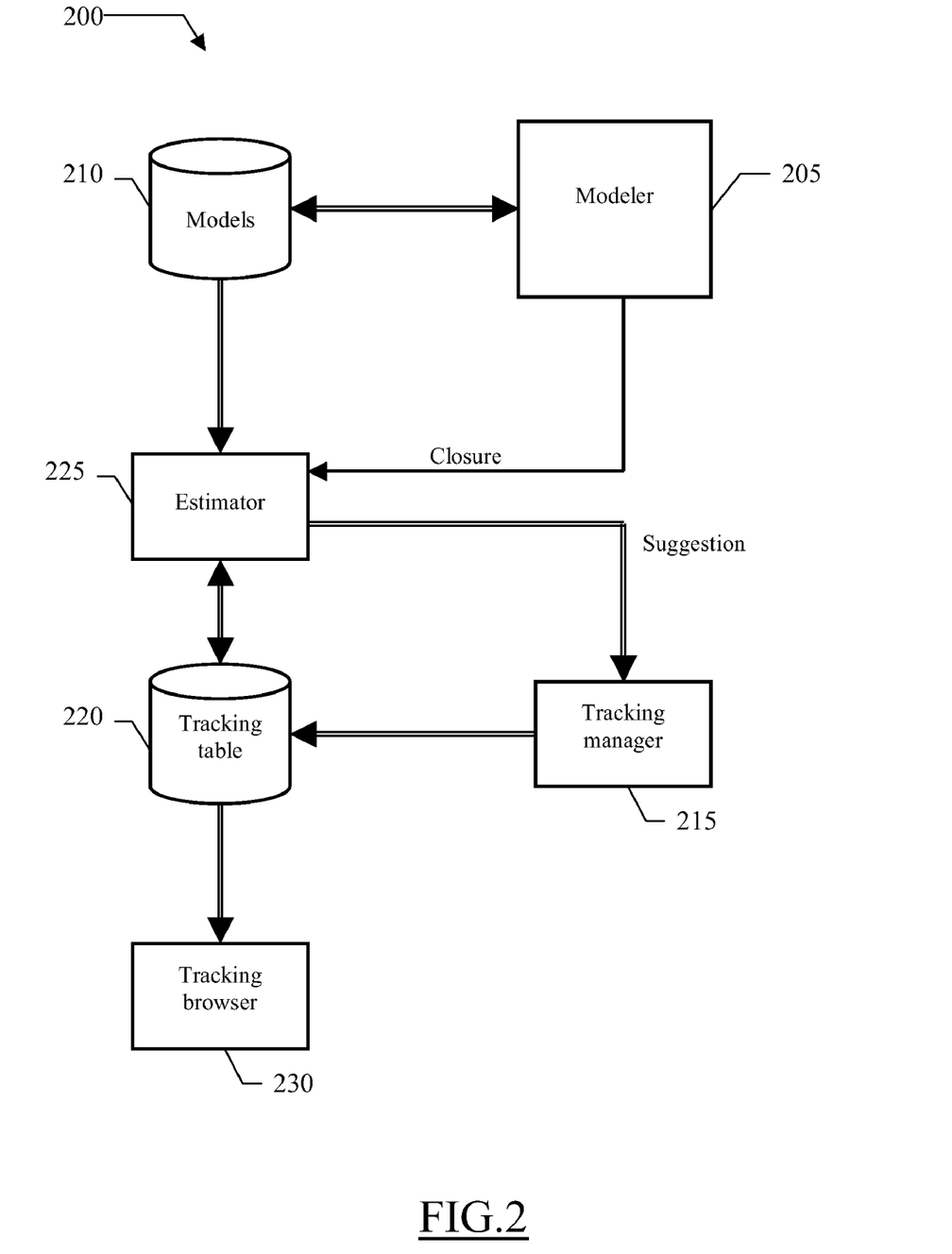
FIG. 2 depicts the main software components that can be used for implementing the solution according to an embodiment of the invention.

Moving to FIG. 2, the main software components that run on the above-described computer are denoted as a whole with the reference 200. The information (programs and data) is typically stored on the hard-disk and loaded (at least partially) into the working memory of the computer when the programs are running, together with an operating system and other application programs (not shown in the figure). The programs are initially installed onto the hard-disk, for example, from CD-ROM.

Particularly, the computer runs a software modeling program, or simply modeler, 205 (for example, the above-mentioned "Rational Rose"). The tool 205 is used to define a series of models for every software application under development; those models are stored into a corresponding repository 210. Preferably, the models are defined in the UML format. Particularly, the UML supports functional models (representing the operation of the application from the point of view of its end-users), object models (representing the structure of the application in object-oriented terms), and dynamic models (representing the behavior of the application); typically, those models are represented graphically by means of corresponding diagrams. For example, use case diagrams show the interactions between the end-users and the application (for the functional models). Likewise, class diagrams show the classes of the application with their relations, object diagrams show the corresponding instances, and deployment diagrams show the hardware/software components of the application (for the object models). At the end, sequence diagrams show the interactions over time between different components of the application, activity diagrams show the sequence of activities performed by the components, collaboration diagrams show the interactions between the components over time, and statechart diagrams show the states of the components with their transitions (for the dynamic models).

In an embodiment of the invention, the computer also includes a tracking manager 215. As described in detail in the following, the module 215 aids tracking the development of the applications. For this purpose, the tracking manager 215 stores information about each application under development into a tracking table 220.

Particularly, the development process is partitioned into multiple activities (each one corresponding to one or more levels of detail of the different models representing the application, down to its actual implementation). The activities are logically organized into a hierarchical structure, which defines a tree starting from a root node representing the whole development process. Each leaf node of the activity tree (having no child nodes depending thereon) is associated with a micro-activity; the micro-activity specifies operations that do not need any further level of detail. On the contrary, each non-leaf node of the activity tree (having one or more levels of child nodes depending thereon) is associated with a macro-activity; the macro-activity represents the aggregation of one of more levels of activities (either macro-activities or micro-activities) corresponding to the depending nodes.

For each i-th (micro- or macro-) activity, the tracking table 220 stores a completion coefficient $COMP_i$, which indicates an effort required to complete the activity (for example, normalized from 1 to 100). The activity is also associated with a progress index $PROG_i$; the progress index $PROG_i$ indicates a current status of the activity, for example, expressed as a percentage from 0% (when the activity is still to be initiated) to 100% (when the activity has been completed). The progress index $PROG_i$ for each micro-activity is a basic piece of information that is set directly according to the actual status of the micro-activity. Conversely, the progress index $PROG_i$ for each macro-activity is an aggregated piece of information that is calculated from the progress indexes $PROG_i$ of its depending activities (with a recursive process down to the micro-activities represented by the leaf nodes of the activity tree). Typically, the accomplishment of each micro-activity involves the definition of a series of corresponding basic items (such as actors, interactions and links for the use case diagrams); in this respect, the tracking table 220 stores a current number $CURR_i$ of the basic items that have already been defined and an estimated total number $TOT_i$ of those basic items that are allegedly required for completing the micro-activity.

An estimator 225 accesses both the model repository 210 and the tracking table 220. Whenever a user (i.e., a developer) closes a working session on a selected micro-activity, the modeler 205 notifies the estimator 225 accordingly. In response thereto, the estimator 225 measures the current number $CURR_i$ of basic items (in the model repository 210) and updates the status of the micro-activity in the tracking table 220 accordingly. The estimator 225 then determines a suggested value of the corresponding progress index $PROG_i$ (according to the information available in the tracking table 220). The estimator 215 supplies the suggested progress index $PROG_i$ to the tracking manager 215. The progress index $PROG_i$ (possibly updated by the user) is then stored into the tracking table 220 (replacing its previous value). At the same time, the estimator 215 refines the estimation of the total number $TOT_i$ according to the new information available in the tracking table 220.

A tracking browser 230 accesses the tracking table 220. The tracking browser 230 allows another user (such as a team leader or a manager) to surf through the activity tree; in this way, the user can select whatever activity and then display the corresponding progress index $PROG_i$.

Figure 3:
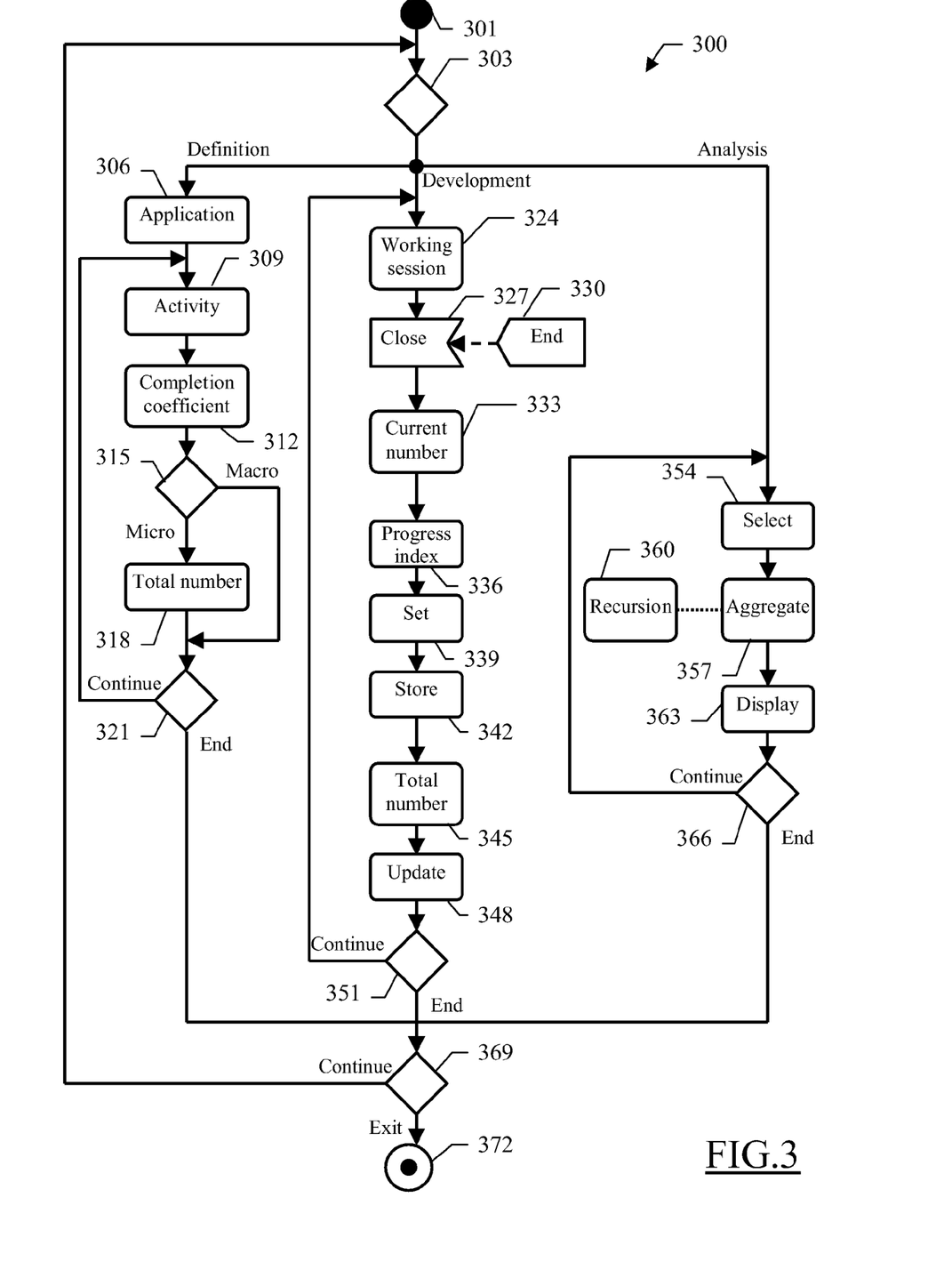
FIG. 3 shows a diagram describing the flow of activities relating to an implementation of the solution according to an embodiment of the invention.

Moving now to FIG. 3, the logic flow of an exemplary process that can be implemented in the above-described system (for tracking the development of a specific application) is represented with a method 300. The method 300 begins at the black start circle 301, and then branches at decision block 303 according to a selection entered by the user. Particularly, if the user wishes to define a new application the blocks 306-321 are executed, if the user wishes to develop the application the blocks 324-351 are executed, whereas if the user wishes to analyze the progress of the development process the blocks 354-366 are executed; in any case, the flow of activity then passes to block 369 (described in the following).

Considering in particular block 306 (definition), the new application is added to the tracking table; in this phase, the corresponding activity tree is initialized to the single root node (associated with the whole development process). A loop is then performed for populating the activity tree. The loop begins at block 309, wherein a new node of the activity tree is appended to another node (for defining a corresponding sub-activity). Continuing to block 312, the user sets the corresponding completion coefficient $COMP_i$. A test is then made at block 315 to determine whether the freshly added node is a leaf node (for a micro-activity). If so, the user at block 318 also enters the estimated total number $TOT_i$ of basic items that he/she expects should be required for completing the micro-activity; the method then passes to block 321. The same point is also reached from block 315 directly when a non-leaf node (for a macro-activity) has been added. A test is now made to determine whether the definition of the activity tree has been completed. If the user wishes to add further nodes for corresponding activities, the method goes back to block 309 to reiterate the process. On the other hand, the block 369 is reached once the application has been completely defined. Similar considerations apply when the user edits the activity tree representing the development process of a preexisting application.

With reference instead to block 324 (development), the user starts a working session on a selected (i-th) micro-activity. The working session is closed at block 327, once the user has terminated working on this micro-activity (block 330). The current number $CURR_i$ of basic items that have been defined is measured at block 333 (and saved into the tracking table). An alleged progress index $PROG_i$ for the micro-activity is then calculated at block 336 by comparing the current number $CURR_i$ with the total number $TOT_i$:

$$PROG_i = \frac{CURR_i}{TOT_i} \cdot 100$$

The progress index $PROG_i$ so obtained is then suggested to the user at block 339; the user may accept this value or s/he may update it so as to reflect the actual perception of the status of the micro-activity. For example, the user increases the progress index $PROG_i$ when complex tasks have been completed or decreases it when critical problems remain to be solved. In this way, the user is allowed to define the real status of each micro-activity according to his/her subjective perception of the micro-activity in progress; nevertheless, the system assists the user in this assessment by suggesting a value that is always based on an objective evaluation of its status. Moreover, this feature may also be used to implement a fully automated solution, which is completely opaque to the users working on the application. In any case, the resulting progress index $PROG_i$ is then stored at block 342 into the tracking table (by replacing its previous value).

Proceeding to block 345, the estimation of the corresponding total number $TOT_i$ of basic items is refined accordingly. First of all, the new total number $TOT_i$ is calculated according to a comparison between the current number $CURR_i$ and the actual value of the progress index $PROG_i$ that has been entered by the user:

$$TOT_i = INT\left[\frac{CURR_i}{PROG_i}\right]$$

In this way, the total number $TOT_i$ is corrected so as to take into account the progress of the micro-activity as perceived by the user. The method then passes to block 348, wherein the total number $TOT_i$ so obtained is updated according to its previous value:

$$TOT_i(\text{new}) = INT\left[\frac{TOT_i(\text{new}) + TOT_i(\text{old})}{2}\right]$$

This additional feature slows down the dynamic of the total number $TOT_i$, so as to filter out sharp changes thereof (for example, due to a transient misinterpretation of the actual progress of the micro-activity by the user).

A test is then made at block 351 to verify whether the user wishes to open a new working session for another micro-activity. In the affirmative case, the method returns to block 324 to reiterate the process. On the contrary, the block 369 is entered.

Considering at the end block 354 (analysis), the user selects a specific activity of the development process. The corresponding progress index $PROG_i$ is calculated at block 357 by aggregating the progress indexes $PROG_i$ of the activities depending thereon (if any) weighted according to the corresponding completion coefficients $COMP_i$. In turn, the progress index $PROG_i$ of each depending activity is likewise calculated by aggregating the progress indexes $PROG_i$ of the activities depending thereon with a recursive process (block 360). The recursive process ends once a micro-activity is reached, in which case the progress index $PROG_i$ is extracted from the tracking table directly. In other words, the progress index $PROG_i$ is given by:

$$PROG_i = \frac{\sum COMP_i \cdot PROG_i}{\sum COMP_i} \text{(dependent)} - \text{if non-leaf node}$$
$$PROG_i - \text{if leaf node}$$

Descending into block 363, the progress index $PROG_i$ so obtained is displayed (on the monitor of the computer). A test is now made at block 366 to determine whether the user wishes to continue analyzing the development process. If so, the flow of activity returns to block 354 so as to allow the user to perform the desired operation (for example, selecting a further activity, expanding the current activity into its sub-activities, or collapsing multiple activities into their parent activity). On the contrary, the block 369 is entered.

With reference now to block 369, the user is asked whether s/he wishes to continue working on the application (either for its definition, development or analysis). If so, the flow of activity returns to block 303 for repeating the operations described above. Conversely, as soon as the user decides to exit the loop, the method ends at the concentric white/black stop circles 372.

Figure 4:
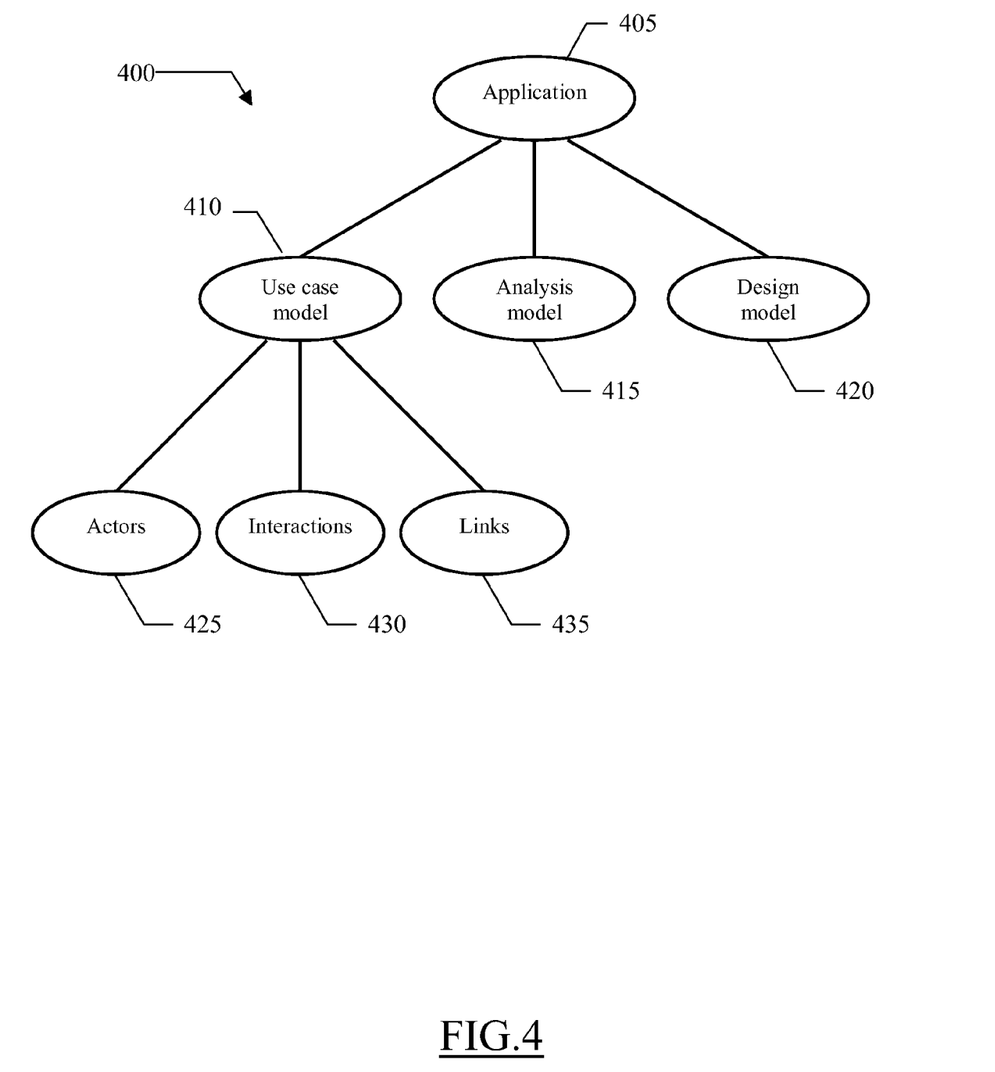
FIG. 4 is a sample activity tree that can be used to exemplify the solution according to an embodiment of the invention.

A sample activity tree that can be used to exemplify the proposed solution is shown in FIG. 4. The figure illustrates a tree 400 relating to the development process of a very simple application. The activity tree 400 starts from a root note 405 associated with a macro-activity representing the whole development process (of a general application model). Three nodes 410-420 depend on the root node 405. Particularly, the (non-leaf) node 410 is associated with a macro-activity representing the definition of a use case model, the (leaf) node 415 is associated with a micro-activity representing the definition of an analysis model, and the (leaf) node 420 is associated with a micro-activity representing the definition of a design model. In turn, three further leaf nodes 425-435 (depending on the node 410) represent micro-activities further detailing the macro-activity of the node 410. Particularly, the node 425 is associated with the definition of the actors of the use cases, the node 430 is associated with the definition of the interactions among those actors (i.e., the use case diagrams), and the node 435 is associated with the definition of the links between the different use cases.

At the beginning, the user assigns the completion coefficient $COMP_i$ to each activity associated with the nodes 410-435 (different from the whole development process); at the same time, the user sets the estimated total numbers $TOT_i$ of basic items for each micro-activity (associated with the nodes 410,420,425-435). An example of those values is shown in the following table:

|  | $COMP_i$ | $PROG_i$ | $CURR_i$ | $TOT_i$ |
|---|---|---|---|---|
| 1. Application model |  |  |  |  |
| 1.1 Use case model | 40 |  |  |  |
| 1.1.1 Actors | 50 |  |  | 80 |
| 1.1.2 Interactions | 90 |  |  | 200 |
| 1.1.3 Links | 70 |  |  | 120 |
| 1.2 Analysis model | 80 |  |  | 100 |
| 1.3 Design model | 50 |  |  | 100 |

Let us assume now that the user opens a working session on the micro-activity relating to the definition of the use case diagrams; at the end, the estimator measures the current number $CURR_i$ of the corresponding basic items representing the interactions among the actors (for example, $CURR_i$=70). The system then calculates and displays the suggested progress index $PROG_i$ of the micro-activity $$\left(PROG_i = \frac{CURR_i}{TOT_i} = \frac{70}{200} = 35\%\right);$$

the user updates this suggested progress index $PROG_i$ (for example, increasing it to $PROG_i$=50% because the most complex use case diagrams have already been defined). The total number $TOT_i$ is accordingly corrected $$\left(TOT_i = INT\left[\frac{CURR_i}{PROG_i}\right] = INT\left[\frac{70}{50}\right] = 140\right)$$

and then updated $$\left(TOT_i(\text{new}) = INT\left[\frac{TOT_i(\text{new}) + TOT_i(\text{old})}{2}\right] = INT\left[\frac{140 + 200}{2}\right] = 170\right).$$

The same operations are repeated continually during the development process. A snapshot of the tracking table at a generic instant is, for example:

|  | $COMP_i$ | $PROG_i$ | $CURR_i$ | $TOT_i$ |
|---|---|---|---|---|
| 1. Application model |  |  |  |  |
| 1.1 Use case model | 40 |  |  |  |
| 1.1.1 Actors | 50 | 91% | 80 | 90 |
| 1.1.2 Interactions | 90 | 57% | 100 | 180 |
| 1.1.3 Links | 70 | 60% | 70 | 130 |
| 1.2 Analysis model | 80 | 25% | 20 | 90 |
| 1.3 Design model | 50 | 48% | 50 | 110 |

Figure 5A:
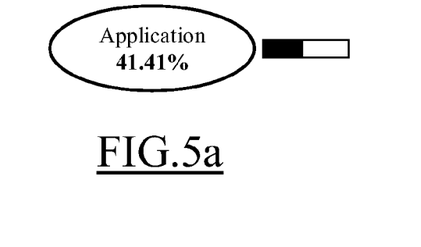
FIGS. 5a-5c illustrate an exemplary scenario of application of the solution according to an embodiment of the invention.

As shown in FIG. 5a, the user wishing to analyze the progress of the development process, for example, selects the activity representing the whole application model. In response thereto, the tracking browser calculates the corresponding progress index $PROG_i$ by aggregating the progress indexes $PROG_i$ of the activities depending thereon. Particularly, the progress index $PROG_i$ of the activity relating to the definition of the use case model is:

$$PROG_i = \frac{\sum_i COMP_i \cdot PROG_i}{\sum COMP_i} \text{ (dependent)}$$

$$= \frac{\left(\frac{50 \cdot 91}{100}\right) + \left(\frac{90 \cdot 57}{100}\right) + \left(\frac{70 \cdot 60}{100}\right)}{50 + 90 + 70}$$

$$= \frac{45.50 + 51.30 + 42.00}{210}$$

$$= 66.01\%$$

It is now possible to calculate the progress index $PROG_i$ of the activity relating to the application model as:

$$PROG_i = \frac{\sum_i COMP_i \cdot PROG_i}{\sum COMP_i} \text{ (dependent)}$$

$$= \frac{\left(\frac{40 \cdot 66.01}{100}\right) + \left(\frac{80 \cdot 25}{100}\right) + \left(\frac{50 \cdot 48}{100}\right)}{40 + 80 + 50}$$

$$= \frac{26.50 + 20.00 + 24.00}{170} = 41.41\%$$

The progress index $PROG_i$ so obtained is then displayed in association with the root node, together with a corresponding progress bar providing an enhanced visual perception of its value.

Figure 5B:
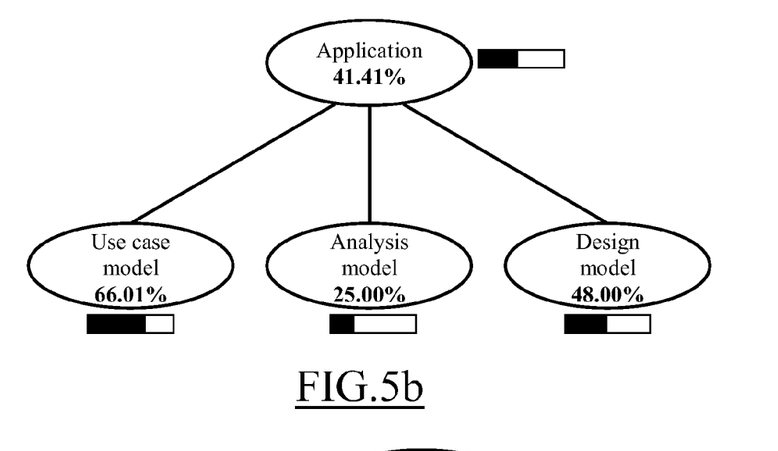

The user can now expand the development process into its sub-activities (see FIG. 5b); in this case as well, the progress indexes $PROG_i$ and the respective progress bars are displayed in association with the corresponding nodes of the activity tree.

Figure 5C:
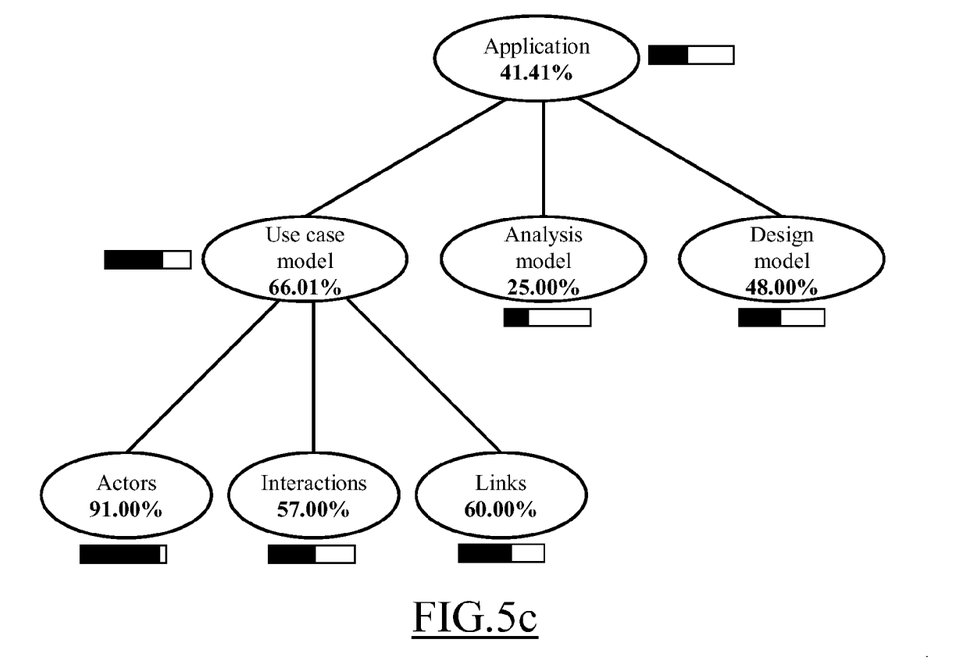

The process can be iterated down to the micro-activities corresponding to the definition of the use case model (see FIG. 5c); as a result, a complete picture of the progress of every activity of the development process is displayed.

The above-described solution allows tracking the progress of the development process is a very simple manner; this result is achieved with an incremental approach, which is based on information collected at the level of the micro-activities of the development process only. Therefore, the proposed solution requires a minimal additional effort (down to none at all) for its implementation.

Nevertheless, the technique devised for aggregating the available information along the activity tree allows showing any desired level of detail of the progress of the development process. In this way, it is possible to have a picture of the real situation of the activities in charge to any actors (in terms of single persons, working teams, departments, and the like).

Moreover, the information about the completion status of every model is now transferred from the head of its developer to the model itself; therefore, any other developer that needs to use the model can have an immediate idea of its completion status (without any need to contact the respective author).

As a result, the task of coordinating the activities of the different actors is strongly simplified.

For example, it is possible to optimize the orchestration of the human resources that are allocated to the development process (for example, moving some developers from a marginal activity to a critical one).

This has a beneficial impact on the yield of the whole development process (substantially reducing its length and cost).

Naturally, in order to satisfy local and specific requirements, a person skilled in the art may apply to the solution described above many modifications and alterations. Particularly, although the present invention has been described with a certain degree of particularity with reference to preferred embodiment(s) thereof, it should be understood that various omissions, substitutions and changes in the form and details as well as other embodiments are possible; moreover, it is expressly intended that specific elements and/or method steps described in connection with any disclosed embodiment of the invention may be incorporated in any other embodiment as a general matter of design choice.

For example, similar considerations apply if the computer has another structure or includes similar elements (such as a cache memory temporarily storing the programs or parts thereof to reduce the accesses to the hard disk during execution); in any case, it is possible to replace the computer with any code execution entity (such as a PDA, a mobile phone, and the like). Although in the preceding description reference has been made to a single computer for the sake of simplicity, it should be readily apparent that the proposed solution is typically applied in a data processing system with distributed architecture; in this case, each user works on a corresponding workstation, with the results of the different activities that are collected on a central server for their analysis.

Without departing from the principles of the invention, the activities may be organized in any other hierarchical structure (having whatever number of levels). Likewise, the completion coefficient and/or the progress index may take different values. In addition, alternative algorithms for aggregating the progress indexes weighted according to the corresponding completion coefficients are tenable (for example, based on their mean square values). Nothing prevents displaying the desired information in any other form (for example, by means of more complex graphics or even in a simple printout).

Alternatively, the user may be prompted to enter the progress indexes of all the activities on which s/he has worked at the log-off from the modeler (so as to avoid repeating the operation when several working sessions are opened in succession for the same activity); however, as indicated above, a fully automated implementation with no user intervention is contemplated.

Similar considerations apply if other basic items are taken into account for suggesting the progress index of the corresponding micro-activity (for example, the number of lines of code that have been written). Moreover, in a more sophisticated implementation it is also possible to partition the basic items into multiple categories (each one associated with a corresponding weighting factor); in this case, the (total) current number of basic items for each micro-activity is defined by the sum of the different (partial) current numbers weighted according to the respective factors.

Alternatively, the total number of basic items for each micro-activity may be set at the closure of its first working session (without any initialization by the user).

In a different embodiment of the invention, the total number is corrected at the closure of the working session according to a different algorithm (for example, of the incremental type).

Likewise, it is possible to update the total number as a function of two or more previous values thereof.

However, nothing prevents only correcting the total number according to the entered progress index (without any filtering based on the previous values); moreover, an implementation wherein the total number is fixed at the definition of the application and it is not updated any longer is feasible.

In any case, the feature of suggesting the progress index of the micro-activity is not strictly necessary, and it may be omitted in a simplified implementation (completely based on the input of the users).

Alternatively, the solution according to the present invention may be used to track any phase of the development process (such as only its design or coding). Moreover, the reference to the models must not be interpreted in a limitative manner, with the same solution that finds application in tracking any activities relating to the development of computer software (such as the actual definition of its modules).

In any case, the technical idea of the invention has equal application to any other formalism for defining the models (such as Petri networks) and/or to any other modeling tool.

Similar considerations apply if the program (which may be used to implement the invention) is structured in a different way, or if additional modules or functions are provided; likewise, the memory structures may be of other types, or may be replaced with equivalent entities (not necessarily consisting of physical storage media). Moreover, the proposed solution lends itself to be implemented with an equivalent method (for example, with similar or additional steps). In any case, the program may take any form suitable to be used by or in connection with any data processing system, such as external or resident software, firmware, or microcode (either in object code or in source code). Moreover, the program may be provided on any computer-usable medium; the medium can be any element suitable to contain, store, communicate, propagate, or transfer the program. Examples of such medium are fixed disks (where the program can be pre-loaded), removable disks, tapes, cards, wires, fibers, wireless connections, networks, broadcast waves, and the like; for example, the medium may be of the electronic, magnetic, optical, electromagnetic, infrared, or semiconductor type.

In any case, the solution according to the present invention lends itself to be carried out with a hardware structure (for example, integrated in a chip of semiconductor material), or with a combination of software and hardware.

The invention claimed is:

1. A method for tracking computer software development comprises:
   organizing the development in a hierarchical structure in a computer, the development including a plurality of activities, with non-leaf activities having other activities depending thereon and leaf activities having no other activity depending thereon;
   associating a completion coefficient with each activity, the completion coefficient being indicative of an effort required to complete the activity;

associating a progress index to each leaf activity, the progress index being indicative of a current progress of the leaf activity;

defining a plurality of basic items necessary to accomplish the leaf activity, wherein a basic item in the plurality of basic items is one of an iteration of the leaf activity and a use case diagram for the leaf activity;

estimating a total number of basic items required to complete the leaf activity;

selecting a non-leaf activity;

calculating an aggregated progress index of the selected activity by aggregating the progress indexes of the activities depending thereon weighted according to the corresponding completion coefficients, wherein a current number of basic items of the leaf activity is determined and compared to the total number for suggesting the progress index of the leaf activity; and displaying the aggregated progress index of the selected activity.

2. The method according to claim 1, wherein the step of associating the progress index to each leaf activity includes:

detecting the closure of a working session for the leaf activity; and prompting a user to enter the progress index in response to the closure of the working session.

3. The method according to claim 1, wherein the step of estimating the total number includes:

prompting the user to initialize the total number.

4. The method according to claim 1, wherein the step of estimating the total number includes:

correcting the total number according to a comparison between the current number and the progress index in response to the closure of the working session.

5. The method according to claim 4, wherein the step of estimating the total number further includes:

updating the total number according to a comparison between a current value and at least one previous value thereof.

6. The method according to claim 1, wherein the activities include at least one modeling activity.

7. The method according to claim 6, wherein each modeling activity is defined according to the UML specification.

8. The method of claim 1, wherein an aggregate progress index for the selected non-leaf activity is computed recursively until each leaf node under the selected non-leaf node is reached, by:

adding (the product of (a completion coefficient of an activity dependent on the selected non-leaf activity and a progress index of the dependent activity) for each non-leaf activity under the selected non-leaf activity) to compute a first sigma;

adding (a completion coefficient of each activity dependent on the selected non-leaf activity) to compute a second sigma; and dividing the first sigma by the second sigma.

9. A computer program in a non-transitory computer readable medium for tracking computer software development in a data processing system, the development including a plurality of activities organized in a hierarchical structure with non-leaf activities having other activities depending thereon and leaf activities having no other activity depending thereon, the computer program comprising:

instructions for associating a completion coefficient with each activity, the completion coefficient being indicative of an effort required to complete the activity;

instructions for associating a progress index to each leaf activity, the progress index being indicative of a current progress of the leaf activity;

instructions for defining a plurality of basic items necessary to accomplish the leaf activity, wherein a basic item in the plurality of basic items is one of an iteration of the leaf activity and a use case diagram for the leaf activity;

instructions for estimating a total number of basic items required to complete the leaf activity;

instructions for selecting a non-leaf activity;

instructions for calculating an aggregated progress index of the selected activity by aggregating the progress indexes of the activities depending thereon weighted according to the corresponding completion coefficients, wherein a current number of basic items of the leaf activity is determined and compared to the total number for suggesting the progress index of the leaf activity; and instructions for displaying the aggregated progress index of the selected activity.

10. The computer program according to claim 9, wherein the instructions for associating the progress index to each leaf activity include:

instructions for detecting the closure of a working session for the leaf activity; and instructions for prompting a user to enter the progress index in response to the closure of the working session.

11. The computer program according to claim 10, wherein the step of estimating the total number includes:

prompting the user to initialize the total number.

12. The computer program according to claim 10, wherein the instructions for estimating the total number include:

instructions for correcting the total number according to a comparison between the current number and the progress index in response to the closure of the working session.

13. The computer program according to claim 12, wherein the instructions for estimating the total number further include:

instructions for updating the total number according to a comparison between a current value and at least one previous value thereof.

14. The computer program according to claim 9, wherein the activities include at least one modeling activity.

15. The computer program according to claim 14, wherein each modeling activity is defined according to the UML specification.

16. A system for tracking computer software development in a data processing system, the development including a plurality of activities organized in a hierarchical structure with non-leaf activities having other activities depending thereon and leaf activities having no other activity depending thereon, the system comprising:

a storage device including a storage medium, wherein the storage device stores computer usable program code; and a processor, wherein the processor executes the computer usable program code, and wherein the computer usable program code comprises:

computer usable code for associating a completion coefficient with each activity, the completion coefficient being indicative of an effort required to complete the activity;

computer usable code for associating a progress index to each leaf activity, the progress index being indicative of a current progress of the leaf activity;

computer usable code for defining a plurality of basic items necessary to accomplish the leaf activity, wherein a basic item in the plurality of basic items is one of an iteration of the leaf activity and a use case diagram for the leaf activity;

computer usable code for estimating a total number of basic items required to complete the leaf activity;

computer usable code for selecting a non-leaf activity;

computer usable code for calculating an aggregated progress index of the selected activity by aggregating the progress indexes of the activities depending thereon weighted according to the corresponding completion coefficients, wherein a current number of basic items of the leaf activity is determined and compared to the total number for suggesting the progress index of the leaf activity; and computer usable code for displaying the aggregated progress index of the selected activity.

* * * * *